Figure 1:
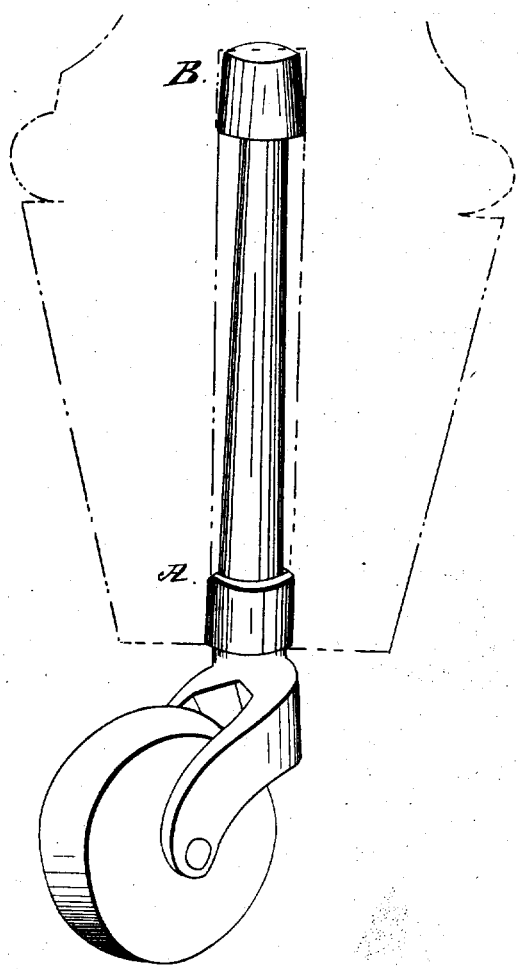

P. E. W. & J. A. Blake,

Furniture Caster.

No. 73. Reissued July 30, 1845.

AM. PHOTO-LITHO. CO. N.Y. (OSBORNE'S PROCESS.)

UNITED STATES PATENT OFFICE.

ELI W. BLAKE, JOHN A. BLAKE, AND PHILOS BLAKE, OF NEW HAVEN, CONN.

IMPROVEMENT IN THE MODE OF CONSTRUCTING CASTERS AND APPLYING THEM TO BEDSTEADS.

Specification forming part of Letters Patent No. 821, dated June 30, 1838; Reissue No. 73, dated July 30, 1845.

*To all whom it may concern:*

Be it known that we, ELI W. BLAKE, JOHN A. BLAKE, and PHILOS BLAKE, of New Haven, in the county of New Haven and State of Connecticut, have invented a new and useful Improvement in Casters; and we do hereby declare that the following is a full and exact description thereof.

Our improved caster belongs to that class of casters which have a revolving vertical axle or pintle.

The improvement consists, chiefly, in a new manner of constructing the fixed part of the caster, or that part which governs the pintle, and which is fixed to the fabric to which the caster is applied.

The chief object which we have sought to accomplish by the improvement is to diminish the expense of fabricating the caster when the pintle is made of unusual length. The freedom with which a caster will traverse about the vertical axis, as well as its permanence and durability in use, other things being equal, is, within certain limits, nearly in proportion to the length of the pintle. This fact has been known to the makers of casters, and accordingly, when it has been intended to secure an unusual degree of freedom of traverse and durability, the pintle has sometimes been made of unusual length; but the casters so made prior to our invention had not gone into general use, for the reason that the manner of constructing the fixed part has been either such as to make the caster too expensive for common use or such as to unsuit it to most purposes and to limit its use to particular fabrics. For these reasons the casters hitherto in use for household-furniture have usually had their pintles very short, seldom exceeding one and a quarter inch in length, and have in consequence not only traversed with so much difficulty that they have in a great measure failed to perform their appropriate office, but have soon worn out and broken down, giving rise to great complaints on the part of housewives.

By means of our improvement we are enabled to give to the pintle all the length requisite to secure the best result, and yet to fabricate the entire caster at less than the expense of fabricating the short-pintle casters heretofore in use when made of the same size, strength, and material. At the same time the improved caster has a general adaptation to most articles of household furniture and can be applied with less expense, with greater facility and dispatch, and with greater firmness and stability than any before known. Thus the great advantages of the long pintle, hitherto enjoyed only to a very limited extent and at great expense, are by our improvement made available for the most cheap and common purposes.

Having thus indicated the nature and purpose of our improvement, we will proceed to describe our improved caster and the manner of its application.

We make the moving parts of the caster, consisting of the wheel, the arms or cheeks between which the wheel revolves, and the pintle, substantially in the usual form. These parts will be respectively recognized in the annexed drawings, Figure 1, where they are shown in perspective. When the wheel is two inches in diameter, we make the pintle about four inches long, and, in general, we deem it best to make the pintle equal in length to about twice the diameter of the wheel employed. The pintle may be made tapering throughout its whole length, as shown in Fig. 1, and it terminates in a conical point, (not seen in Fig. 1, but shown in Fig. 2, where P is the section of a pintle similar in this respect.) In this part of the caster, (the moving part,) in itself considered, and so far as now described, there is nothing that we claim as our invention.

We make the fixed part of the caster in two distinct pieces, which we call the "lower" and "upper" bearings. These are shown in perspective at A and B, Fig. 1, and in section at A and B, Fig. 2. The lower bearing, A, is a simple hoop or bush, consisting of a strip of sheet-iron of suitable length, and about half of an inch in width, bent into a circle or hollow cylinder of such internal diameter that the pintle will revolve freely in it, the ends of the strip being merely butted together. One end of this cylindrical bush is beveled off on the outside, as represented in the drawings. The upper bearing, B, is a cylindrical piece of cast-iron, slightly tapered, being a little the smallest at the upper end. It is about five-eighths of an inch in length, and the diameter of its lower end is equal to that of the lower bearing. In the lower end of this piece is a conical cavity to receive the point of the pintle. For important reasons, which will be hereinafter explained, we make this cavity broader than the conical termination of the pintle, and its angle more obtuse than that of the point of the pintle, as shown in the drawings.

To apply the caster when constructed as above set forth a hole is to be bored in the center of the leg of the bedstead or other fabric of a diameter a little less than that of the bearings, and of a depth a little less than the united length of the pintle and upper bearing when placed together, as shown in the drawings. The upper bearing is then to be inserted and firmly driven down upon the bottom of the hole, after which the lower bearing is to be placed with its beveled end upon the mouth of the hole and driven in. The pintle is then to be introduced. The converging cavity in the upper bearing will guide the point of the pintle to its proper position at the center, when its further progress will be arrested and the weight of the fabric will rest upon that point.

In Fig. 1 the dotted lines represent a leg in section to which the caster has been thus applied. This caster would operate tolerably well though the lower bearing be dispensed with, as the length of the pintle so reduces the lateral pressure at its lower end that the wood, if hard, might be competent to sustain it. We deem it better, however, always to employ the lower bearing, for it has another important office besides that of resisting the pressure and wear. It serves to fur the pintle off from the sides of the hole, and thus to insure the lateral pressure to come at the lower end of the pintle. If this bearing be not employed, and if the hole should happen to be slightly crooked, the lateral pressure might come at a point higher up, which would cause the pintle to bind and endanger it to be broken.

When the caster is constructed and applied in the manner above described, the wheel and pintle may be instantly removed from the leg and replaced at pleasure, which is in some cases a useful property in a caster, and particularly when applied to bedsteads, because the bedstead may thereby be more easily taken to pieces and put together, and may be transported with less danger of breaking the casters. It also allows the caster at any moment to be taken off and oiled to prevent the squeaking noise which will occur in all casters after long use. This is a new property in a caster, no other caster having been designed for use in this manner, and all others having had their fixed and movable parts so secured together that the latter cannot be removed without the employment of tools for that purpose.

Figure 2:
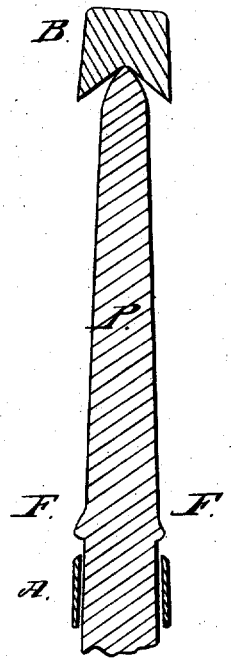

When we do not desire to have the caster possess the property above named, but to have the entire caster secured to the fabric to which it may be applied, we cast the pintle with a small flange surrounding it, as shown in section at F F, Fig. 2. The lower bearing is placed upon the pintle below this flange, which may be done by making it in one piece and bending it around the pintle, or by making it in two semicircular or two semi-cylindrical pieces, and in applying the caster, the upper bearing having been first driven to its place, the pintle and lower bearing are to be introduced together into the hole in the leg, and the bearing is then driven in carrying the pintle with it. We have also contemplated securing the pintle to the leg through the medium of the upper bearing by causing the pintle to terminate in a wire or pivot running up through a hole in said bearing, and securing it there by riveting it over a collet above said bearing.

Having now described our improved caster and shown the mode of its application, we will proceed to point out the differences between it and other casters before known, and to show the utility and importance of these points of novelty.

So far as is known to us, all other casters which have had a revolving pintle, and which have been designed and suited for application concentric with the legs of furniture, (which is the only manner of application well suited to most articles,) have had the fixed part of the caster made in one piece, either in the form of one continuous sheath covering the whole pintle or in the form of a frame consisting of an upper and a lower bearing joined together by bars extending from one to the other. Either of these modes of constructing the fixed part of the caster, in whatever form the same may be put, is much more expensive than to make the two bearings herein described, and more especially so when the pintle is made as long as we have described it to be in our caster. The sheath and frame when suited to such a pintle, are also much more difficult of application. They will not bear forcing into a hole which is slightly crooked, or which they do not exactly fit, but will be broken by the process or will burst the leg. On the other hand, the two bearings described being small will be little liable to split the leg though driven into a hole somewhat smaller in diameter than themselves, and will follow such hole, though it be crooked, as it is quite likely to be when bored in the direction of the grain of the wood.

We are aware that casters have heretofore been made for iron safes and for some other articles which have had their fixed parts in two distinct pieces; but in such cases the distinct bearing-pins were not designed for application in the manner herein set forth, nor were they susceptible of such application. They were designed for attachment to the exterior of the fabric, and were in all cases provided with wings, flanges, shanks, or other adjuncts suiting them to that purpose, and unsuiting them to be inserted in a hole in the manner herein described.

We believe that before our invention no caster has been made whose fixed part consisted of two distinct pieces of cylindrical or other analogous form, suiting them to be driven into a hole in the manner herein set forth.

Some few of the casters heretofore in use have had the end of the pintle formed into a conical point entering a conical cavity in the fixed part of the caster, and have borne the weight of the fabric resting upon that point; but in such cases the breadth of the cavity has been made equal to but never designedly greater than that portion of the point of the pintle which entered into and was brought into actual contact with it, and the angle of the said cavity has been made equal to that of the point of the pintle, or nearly so, both being carefully fitted together. In distinction from this mode of adapting these two parts to each other we make the cavity in the upper bearing-piece several times broader and deeper than the touching surface upon the point of the pintle, and we make the angle of the cavity more obtuse than that of the point of the pintle. The importance of these new features will appear from the following considerations: The bearing-surface upon the point of the pintle should be made as small as practicable, because, other things being equal, the friction upon that point is in proportion to the diameter of the touching surface. If, then, the cavity were made no larger it would be difficult to confine the point of the pintle within it. The slightly raising the fabric to which the caster was applied, or the passing over a fold in the carpet or an unevenness in the floor, would throw it out of place, and it would not return when the weight of the fabric should again come down upon it. We therefore make the cavity broad and deep enough to catch the point of the pintle in whatever position it may present itself, and conduct it directly to its small bearing place at the center. By making the angular point of the cavity more obtuse than that of the pintle we insure the reduction of the touching surface to a small diameter. We also thereby avoid the binding effect upon the point of the pintle which would otherwise occur in case the upper bearing should not stand in an exact line with the pintle. Such are the useful results of these new features when considered severally. Their united effect is such as to accomplish the following important end, which greatly facilitates the fabrication of the caster, to wit: It enables us to cast the pintle ready pointed, and to cast the bearing with the cavity ready formed in it, and bring them together as cast without any fitting, notwithstanding both may have in a considerable degree the imperfections unavoidably incident to the process of casting. This, we believe, has never before been done, nor could it be with any certainty of a useful result if the point and cavity were made, as heretofore, of the same dimensions and angle.

Before our invention various modes were employed of securing the pintle to the fixed part of the caster, and through that to the fabric on which the caster might be set. Most of these modes have been such as materially to weaken the pintle near the point of greatest strain, and all of them, so far as known to us, have been more expensive than that herein first described.

We believe that the pintle of a caster was never before made with a solid flange projecting therefrom above the lower bearing for that purpose, as herein described.

What we claim as our invention, and wish to secure by Letters Patent, is as follows:

1. The combination of parts consisting of the wheel, the pintle, and the two distinct bearings or bearing-pieces, said bearing-pieces being made as set forth—that is to say, being made in a cylindrical or other analogous form, for the purpose of suiting them to be inserted in a hole, as set forth.

2. The combination of parts consisting of the wheel, the pintle, and the upper bearing, said pintle and bearing being made and adapted to each other substantially in the manner set forth.

3. The flange on the pintle located and made thereon in the place and manner and for the purpose set forth.

ELI W. BLAKE.
JOHN A. BLAKE.
PHILOS BLAKE.

Witnesses:
WILLIAM LLOYD,
CHESTER WARNER.